US010086319B1

(12) United States Patent
Suavet

(10) Patent No.: US 10,086,319 B1
(45) Date of Patent: Oct. 2, 2018

(54) POOL FILTER CLEANER

(71) Applicant: Ryan Charles Suavet, North Tustin, CA (US)

(72) Inventor: Ryan Charles Suavet, North Tustin, CA (US)

(*) Notice: Subject to any disclaimer, the term of this patent is extended or adjusted under 35 U.S.C. 154(b) by 71 days.

(21) Appl. No.: 15/225,988

(22) Filed: Aug. 2, 2016

(51) Int. Cl.
*B01D 29/62* (2006.01)
*B05B 1/06* (2006.01)
*B08B 3/02* (2006.01)
*B08B 3/04* (2006.01)
*B01D 29/64* (2006.01)

(52) U.S. Cl.
CPC ............ *B01D 29/6446* (2013.01); *B05B 1/06* (2013.01); *B08B 3/024* (2013.01); *B08B 3/026* (2013.01)

(58) Field of Classification Search
CPC ....... B01D 29/6446; B05B 1/06; B08B 3/024; B08B 3/026
See application file for complete search history.

(56) References Cited

U.S. PATENT DOCUMENTS

| | | | |
|---|---|---|---|
| 1,691,950 A * | 11/1928 | Wright | B01D 33/06 210/386 |
| 2,980,256 A | 4/1961 | Nash | |
| 4,709,717 A * | 12/1987 | Rannigan | B05C 17/0245 134/199 |
| 5,292,074 A * | 3/1994 | Clark | B05B 13/0278 134/199 |
| 5,384,045 A | 1/1995 | Chmielewski | |
| 6,463,943 B1 * | 10/2002 | Monroe | B01D 41/04 134/152 |
| 6,709,581 B2 | 3/2004 | Leckal | |
| 7,311,823 B2 | 12/2007 | Brooke | |
| 7,828,964 B1 * | 11/2010 | Neibert | B01D 41/04 134/198 |
| D639,398 S | 6/2011 | Wilhelm | |
| 9,675,910 B1 * | 6/2017 | Wade | B01D 29/0077 |
| 2002/0011259 A1 * | 1/2002 | Pociask | B08B 3/026 134/34 |
| 2004/0047675 A1 | 3/2004 | Bonelli | |
| 2009/0056753 A1 * | 3/2009 | Heathcote | B01D 29/07 134/16 |
| 2010/0037926 A1 * | 2/2010 | Bunting | B01D 41/04 134/166 R |
| 2011/0000506 A1 * | 1/2011 | Martin | B01D 41/04 134/18 |

(Continued)

FOREIGN PATENT DOCUMENTS

WO    2006116810 A1    11/2006

*Primary Examiner* — Michael E Barr
*Assistant Examiner* — Benjamin L Osterhout

(57) ABSTRACT

The pool filter cleaner is adapted for use with a diatomaceous earth pool filter. The pool filter cleaner cleans the diatomaceous earth pool filter. The diatomaceous earth pool filter further comprises a diatomaceous filter cartridge. The pool filter cleaner is a water-spraying device. The pool filter cleaner is formed with a spray device that connects to a water source. The spray device surrounds the diatomaceous filter cartridge. The spray device cleans the diatomaceous filter by spraying water on the surface of the diatomaceous filter cartridge. The pool filter cleaner comprises the spray device and a connection. The connection attaches the spray device to the water source.

4 Claims, 5 Drawing Sheets

(56) References Cited

U.S. PATENT DOCUMENTS

| | | | |
|---|---|---|---|
| 2011/0226291 A1* | 9/2011 | Toussaint | E04H 4/12 134/157 |
| 2011/0232699 A1* | 9/2011 | Schreiber | B01D 41/00 134/198 |
| 2014/0000045 A1* | 1/2014 | Bunting | B01D 35/16 15/104.05 |
| 2014/0326656 A1* | 11/2014 | Greenfield | B01D 29/68 210/460 |

* cited by examiner

POOL FILTER CLEANER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physical or chemical processes including filtration and separation of solids from solids, more specifically, a regeneration device for filters.

SUMMARY OF INVENTION

The pool filter cleaner is adapted for use with a diatomaceous earth pool filter. The pool filter cleaner cleans the diatomaceous earth pool filter. The diatomaceous earth pool filter further comprises a diatomaceous filter cartridge. The pool filter cleaner is a water spraying device. The pool filter cleaner is formed with a spray device that connects to a water source. The spray device surrounds the diatomaceous filter cartridge. The spray device cleans the diatomaceous filter by spraying water on the surface of the diatomaceous filter cartridge.

These together with additional objects, features and advantages of the pool filter cleaner will be readily apparent to those of ordinary skill in the art upon reading the following detailed description of the presently preferred, but nonetheless illustrative, embodiments when taken in conjunction with the accompanying drawings.

In this respect, before explaining the current embodiments of the pool filter cleaner in detail, it is to be understood that the pool filter cleaner is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pool filter cleaner.

It is therefore important that the claims be regarded as including such equivalent construction insofar as they do not depart from the spirit and scope of the pool filter cleaner. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
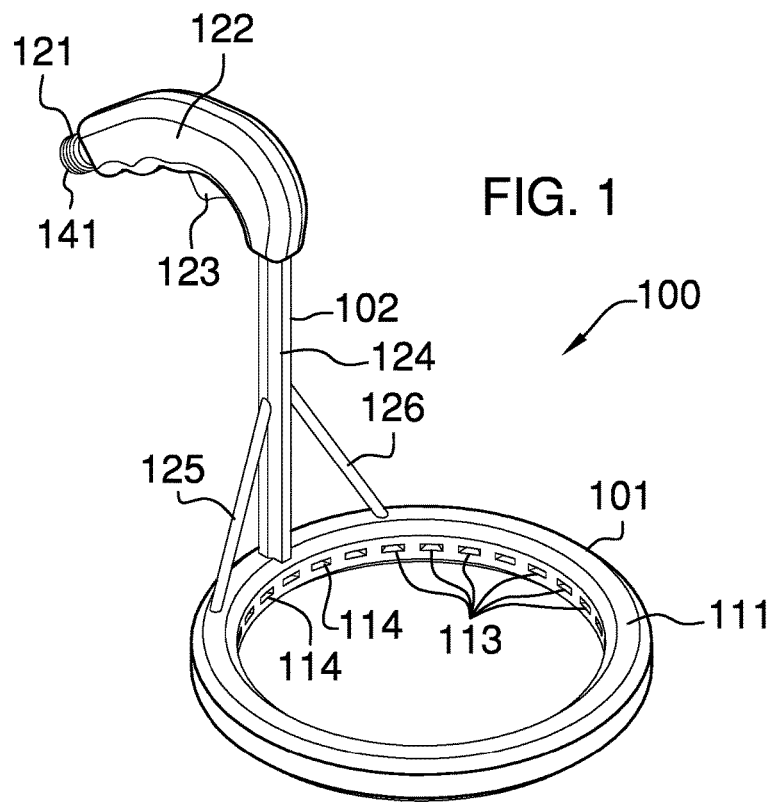
FIG. 1 is a perspective view of an embodiment of the disclosure.
Figure 2:
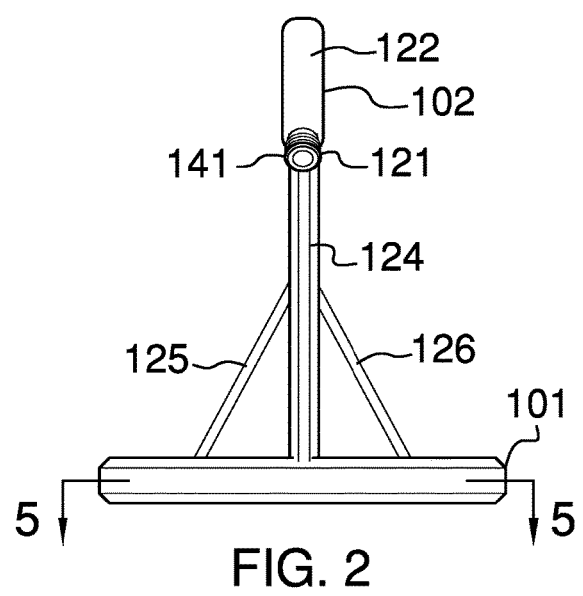
FIG. 2 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 8.

The pool filter cleaner 100 (hereinafter invention) comprises the spray device 101 and a connection 102. The connection 102 attaches the spray device 101 to a water source 132. The invention 100 is adapted for use with a diatomaceous earth pool filter. The invention 100 cleans the diatomaceous earth pool filter. The diatomaceous earth pool filter further comprises a diatomaceous filter cartridge 131. The invention 100 is a water-spraying device. The invention 100 is formed with a spray device 101 that connects to a water source 132. The spray device 101 surrounds the diatomaceous filter cartridge 131. The spray device 101 cleans the diatomaceous filter by spraying water on the surface of the diatomaceous filter cartridge 131. The invention 100 comprises the spray device 101 and a connection 102. The connection 102 attaches the spray device 101 to the water source 132.

The spray device 101 comprises a spray loop 111, a first inner channel 112, and a plurality of spray nozzles 113. The first inner channel 112 is formed within the spray loop 111. The plurality of spray nozzles 113 release water from the first inner channel 112 onto the diatomaceous filter cartridge 131. As shown most clearly in FIG. 5, the spray loop 111 is a hollow rigid structural loop. The spray loop 111 is formed in the shape of either a circle 151 or a kidney 152. The inner diameter of the spray loop 111 is larger than the outer diameter of the diatomaceous filter cartridge 131 such that the diatomaceous filter cartridge 131 can be inserted into the loop formed by the spray loop 111. The first inner channel 112 is a slot that is formed in the spray loop 111. The first inner channel 112 is connected to the connection 102 such that the connection 102 delivers water from the water source 132 into the first inner channel 112.

Each individual spray nozzle 114 releases water out of the spray loop 111 in a direction directly towards the center point of the spray loop 111. The plurality of spray nozzles 113 are evenly distributed along the inner circumference 117 of the spray loop 111. From this position, the plurality of spray nozzles 113 spray water directly on the diatomaceous filter cartridge 131 when the diatomaceous filter cartridge 131 is inserted through the center of the spray loop 111. Each individual spray nozzle 114 comprises an aperture 115 and a dispersion geometry 116. The aperture 115 is a hole that provides the fluidic connection between the first inner channel 112 and the individual spray nozzle 114 such that water will flow into and through the individual spray nozzle 114. The dispersion geometry 116 is a negative space that is formed between the first inner channel 112 and the inner circumference 117 of the spray loop 111.

The form factor of the dispersion geometry 116 determines the spray pattern of the water released through the plurality of spray nozzles 113. The geometric relationships between the form factor of a channel and the spray pattern of a nozzle are well known and documented within engineering arts. In the first potential embodiment of the form factor of the dispersion geometry 116 generates a jet spray. In the second potential embodiment of the form factor of the dispersion geometry 116 generates an atomized spray.

The connection 102 comprises a threaded connection 121, a handle 122, a triggered valve 123, a pipe 124, a first support 125, and a second support 126. The threaded connection 121, the handle 122, the triggered valve 123, and the pipe 124 are interconnected such that the threaded connection 121, the handle 122, the triggered valve 123, and the pipe 124 forms a second inner channel 127 that feeds water from the water source 132 to the first inner channel 112. The threaded connection 121 feeds water into the second inner channel 127.

Figure 3:
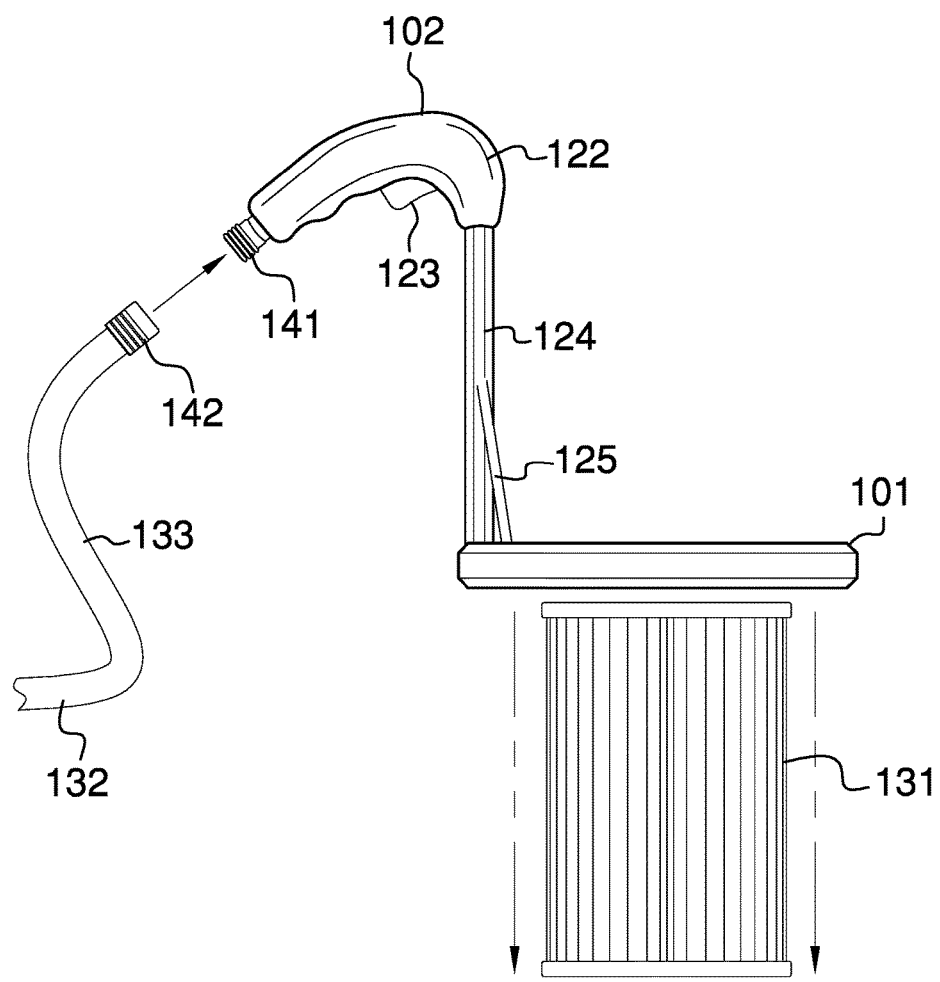
FIG. 3 is an alternate side view of an embodiment of the disclosure.
Figure 4:
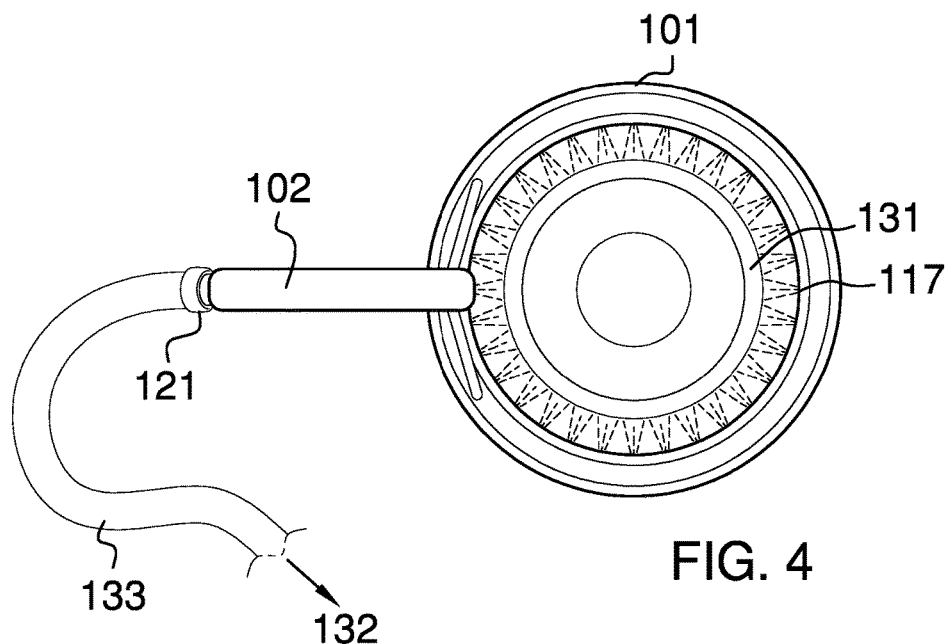
FIG. 4 is an in use view of an embodiment of the disclosure.
Figure 5:
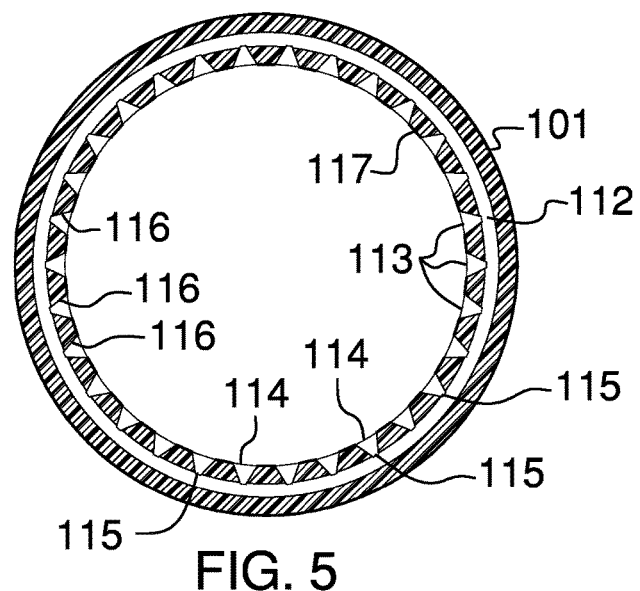
FIG. 5 is a cross-sectional view of an embodiment of the disclosure across 5-5 as shown in FIG. 2.
Figure 6:
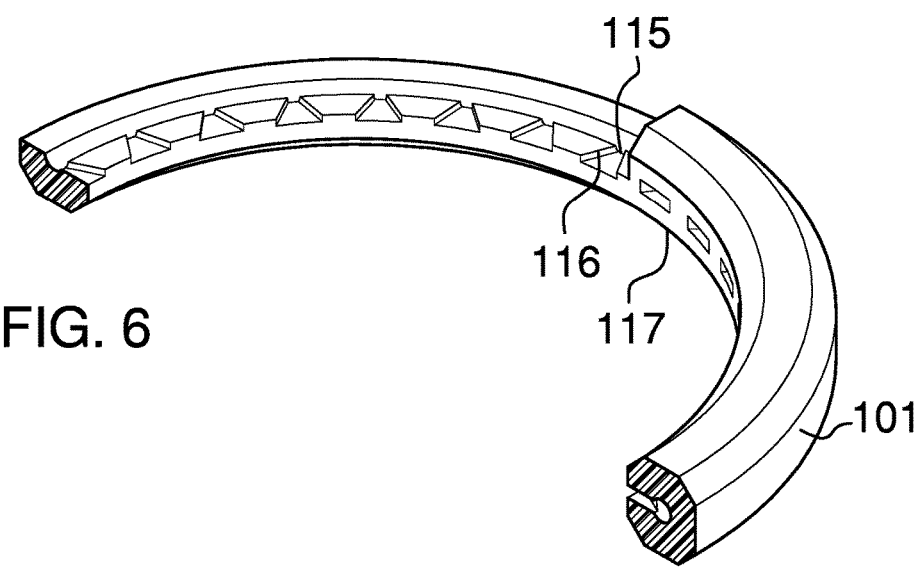
FIG. 6 is a detail view of an embodiment of the disclosure.
Figure 7:
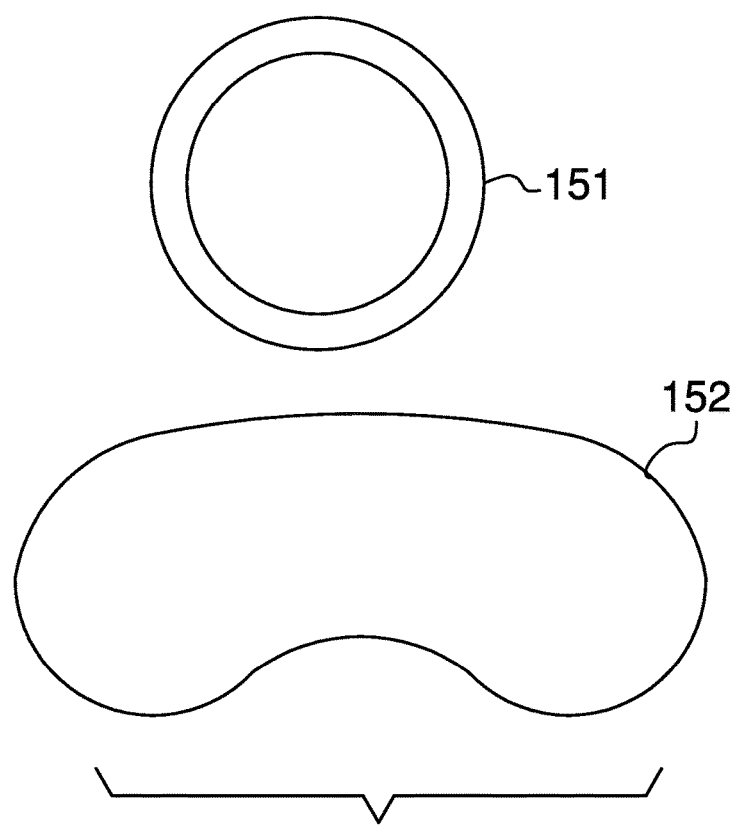
FIG. 7 is detail views of embodiments of the disclosure.
Figure 8:
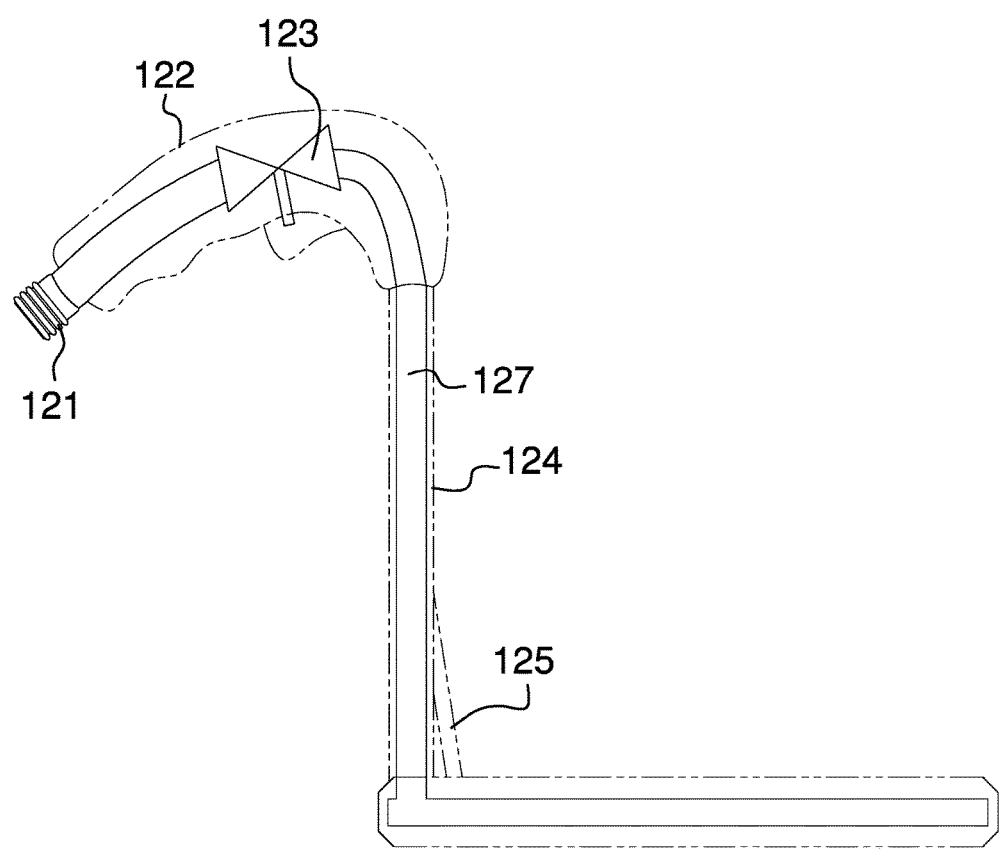
FIG. 8 is an internal view of an embodiment of the disclosure.

As shown most clearly in FIG. 3, the threaded connection 121 comprises an exterior screw thread 141. The exterior screw thread 141 is adapted to connect with the interior screw thread 142 of a hose 133 such that the exterior screw thread 141 and the interior screw thread 142 will: 1) form the threaded connection 121; and, 2) connect the second inner channel 127 to the water source 132. The triggered valve 123 is a readily and commercially available spring-loaded valve that is used to control the flow of water into the second inner channel 127. In the first potential embodiment of the disclosure, the triggered valve 123 is a readily and commercially available spray hose nozzle that is modified such that spray nozzle assembly of the spray hose nozzle has been removed. The handle 122 is a grip that is formed from a readily and commercially available non-skid material that covers the triggered valve 123 for the purpose of improving the handling and control of the invention 100.

Suitable non-skid materials include, but are not limited to, a readily and commercially available non-skid tape. The triggered valve 123 provides the fluidic connection between the threaded connection 121 and the pipe 124. The pipe 124 is a readily and commercially available pipe that transports water from the triggered valve 123 to the first inner channel 112 of the spray loop 111. Methods to attach the pipe 124 to the first inner channel 112 of the spray loop 111 are well known in the mechanical and engineering arts. The first support 125 and the second support 126 are struts that attach from the pipe 124 to the spray loop 111 in order to provide stability to the invention 100 by preventing torqueing forces from rotating the spray loop 111 relative to the pipe 124. Methods to install stabilizing struts are well known in the mechanical and engineering arts.

To use the invention 100, the shape of the spray loop 111 is first selected. For a diatomaceous filter cartridge 131 shaped in the form of a cylinder, a circular 151 spray loop 111 is selected. For a diatomaceous filter cartridge 131 shaped in the form of a kidney, a kidney 152 shaped spray loop 111 is selected. The interior screw thread 142 of the hose 133 is attached to the exterior screw thread 141 of the threaded connection 121. The hose 133 is connected to a water source 132. The water source 132 is then turned on. The spray loop 111 is then placed around the diatomaceous filter cartridge 131 and water is sprayed on the diatomaceous filter cartridge 131 by activating the triggered valve 123.

In the first potential embodiment of the disclosure, the spray device 101 and the connection 102 are formed as a single unit from molded plastic. Suitable plastics include, but are not limited to, polyvinylchloride or polyethylene.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two-cylinder or like structures share the same line they are said to be aligned. When the center axes of two-cylinder like structures do not share the same line they are said to be offset.

Cylinder: As used in this disclosure, a cylinder is a geometric structure defined by two identical flat and parallel ends, also commonly referred to as bases, which are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder, which is defined as a cylinder wherein the curved surface perpendicularly intersects with the two identical flat and parallel ends.

DE: As used in this disclosure, DE is an acronym for diatomaceous earth.

Diameter: As used in this disclosure, a diameter of an object is a straight-line segment that passes through the center of an object. The line segment of the diameter is terminated at the perimeter or boundary of the object through which the line segment of the diameter runs.

Diatomaceous Earth: As used in this disclosure, diatomaceous earth is a mineral that is primarily composed of silicon dioxide. A source for diatomaceous earth is the fossilized remains of diatoms.

Disk: As used in this disclosure, a disk is a cylindrically shaped object that is flat in appearance.

Exterior Screw Thread: An exterior screw thread is a ridge wrapped around the outer surface of a tube in the form of a helical structure that is used to convert rotational movement into linear movement.

Form Factor: As used in this disclosure, the term form factor refers to the size and shape of an object.

Grip: As used in this disclosure, a grip is a covering that is over a shaft.

Handle: As used in this disclosure, a handle is an object by which a tool, object, or door is held or manipulated with the hand.

Hose: As used in this disclosure, a hose is a flexible hollow cylindrical device that is used for transporting liquids and gasses. When referring to a hose in this disclosure, the terms inner diameter and outer diameter are used as they would be used by those skilled in the plumbing arts.

Inner Diameter: As used in this disclosure, the term inner diameter is used in the same way that a plumber would refer to the inner diameter of a pipe.

Interior Screw Thread: An interior screw thread is a groove that is formed around the inner surface of a tube in the form of a helical structure that is used to convert rotational movement into linear movement.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

Non-Skid Material: As used in this disclosure, a non-skid material is a commercially available product that can be applied to an object such that the object is inhibited from sliding along the surface upon which the object is resting. Non-skid materials are often, but not always, adhesive or abrasive materials.

Outer Diameter: As used in this disclosure, the term outer diameter is used in the same way that a plumber would refer to the outer diameter of a pipe.

Perimeter: As used in this disclosure, a perimeter is one or more curved or straight lines that binds an enclosed area on a plane or surface. The perimeter of a circle is commonly referred to as a circumference.

Pipe: As used in this disclosure, a pipe is a hollow cylindrical device that is used for transporting liquids and gasses. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

Slot: As used in this disclosure, a slot is a long narrow groove or aperture that is formed in an object.

Threaded Connection: As used in this disclosure, a threaded connection is a type of fastener that is used to join a first tube shaped and a second tube shaped object together. The first tube shaped object is fitted with fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

Trigger: As used in this disclosure, a trigger is a lever that operates in conjunction with a spring or similar device such that: 1) the lever is used to activate a mechanism; and 2) the spring or similar device returns the lever to its original position after the mechanism has been activated.

Valve: As used in this disclosure, a valve is a device that is use to control the flow of a fluid (gas or liquid) through a pipe.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A regeneration device for a filter comprising:
a spray device and a connection;
wherein the connection attaches the spray device to a water source;
wherein the regeneration device for a filter is adapted for use with a diatomaceous earth pool filter;
wherein the regeneration device for a filter cleans the diatomaceous earth pool filter;
wherein the diatomaceous earth pool filter further comprises a diatomaceous filter cartridge;
wherein the regeneration device for a filter is a water spraying device;
wherein the regeneration device for a filter is formed with a spray device that connects to a water source;
wherein the spray device surrounds the diatomaceous filter cartridge;
wherein the spray device comprises a spray loop, a first inner channel, and a plurality of spray nozzles;
wherein the first inner channel is formed within the spray loop;
wherein the plurality of spray nozzles releases water from the first inner channel onto the diatomaceous filter cartridge;
wherein the spray loop is a hollow rigid structural loop;
wherein the inner diameter of the spray loop is larger than the outer diameter of the diatomaceous filter cartridge such that the diatomaceous filter cartridge can be inserted into the loop formed by the spray loop;
wherein the first inner channel is a slot that is formed in the spray loop;
wherein the first inner channel is connected to the connection such that the connection delivers water from the water source into the first inner channel;

wherein each individual spray nozzle releases water out of the spray loop in a direction directly towards the center point of the spray loop;

wherein the plurality of spray nozzles are evenly distributed along the inner perimeter of the spray loop;

wherein the plurality of spray nozzles spray water directly on the diatomaceous filter cartridge when the diatomaceous filter cartridge is inserted through the center of the spray loop;

wherein each individual spray nozzle comprises an aperture and a dispersion geometry;

wherein the aperture is a hole that provides the fluidic connection between the first inner channel and the individual spray nozzle such that water will flow into and through the individual spray nozzle;

wherein the dispersion geometry is a negative space that is formed between the first inner channel and the inner circumference of the spray loop;

wherein the form factor of the dispersion geometry determines the spray pattern of the water released through the plurality of spray nozzles;

wherein the connection comprises a threaded connection, a handle, a triggered valve, a pipe, a first support, and a second support;

wherein the threaded connection, the handle, the triggered valve, and the pipe are interconnected such that the threaded connection, the handle, the triggered valve, and the pipe forms a second inner channel that feeds water from the water source to the first inner channel;

wherein the threaded connection feeds water into the second inner channel;

wherein the threaded connection comprises an exterior screw thread;

wherein the exterior screw thread is adapted to connect with the interior screw thread of a hose such that the exterior screw thread and the interior screw thread form the threaded connection;

wherein the triggered valve is a spring loaded valve that controls the flow of water into the second inner channel;

wherein the triggered valve provides the fluidic connection between the threaded connection and the pipe;

wherein the first support is a strut that attaches from the pipe to the spray loop;

wherein the second support is a strut that attaches from the pipe to the spray loop;

wherein the first support prevents torqueing forces from rotating the spray loop relative to the pipe;

wherein the second support prevents torqueing forces from rotating the spray loop relative to the pipe.

2. The regeneration device for a filter according to claim 1 wherein the form factor of the dispersion geometry generates a jet spray.

3. The regeneration device for a filter according to claim 1 wherein the shape of the spray loop is selected from the group consisting of a circle shape or a kidney shape.

4. The regeneration device for a filter according to claim 1 wherein the form factor of the dispersion geometry generates an atomized spray.

* * * * *